(12) United States Patent
Djukanovic et al.

(10) Patent No.: US 12,384,704 B2
(45) Date of Patent: Aug. 12, 2025

(54) METHODS OF TREATING WATER TO REMOVE SELENIUM OR MERCURY

(71) Applicant: CHEMTREAT, INC., Glen Allen, VA (US)

(72) Inventors: Vladimir Djukanovic, Glen Allen, VA (US); William Henderson, Glen Allen, VA (US); Nicholas Seymour, Williamsburg, VA (US); Robert Jeffers, Glen Allen, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 433 days.

(21) Appl. No.: 17/139,060

(22) Filed: Dec. 31, 2020

(65) Prior Publication Data
US 2022/0204369 A1    Jun. 30, 2022

(51) Int. Cl.
*C02F 1/70* (2023.01)
*C02F 1/66* (2023.01)
*C02F 101/10* (2006.01)
*C02F 101/16* (2006.01)
*C02F 101/20* (2006.01)

(52) U.S. Cl.
CPC .............. *C02F 1/705* (2013.01); *C02F 1/66* (2013.01); *C02F 2101/103* (2013.01); *C02F 2101/106* (2013.01); *C02F 2101/163* (2013.01); *C02F 2101/20* (2013.01); *C02F 2303/18* (2013.01)

(58) Field of Classification Search
CPC ....... A47B 88/473; A47B 88/50; C02F 1/001; C02F 1/442; C02F 1/78; C02F 2103/023; C02F 2103/18; C02F 2103/42; C02F 2201/784; C02F 2301/026; C02F 2301/043; C02F 2301/046; C02F 1/444; C02F 2103/06; E04H 5/12; E04H 4/1209; B25H 3/02; B01F 23/2323; B01F 23/237613; B01F 25/1041; B01F 25/53
See application file for complete search history.

(56) References Cited

U.S. PATENT DOCUMENTS

| | | | |
|---|---|---|---|
| 3,933,635 A * | 1/1976 | Marchant | C22B 19/26 423/510 |
| 4,405,464 A | 9/1983 | Baldwin et al. | |
| 6,030,520 A | 2/2000 | Dziewinski et al. | |
| 6,436,275 B1 | 8/2002 | Dziewinski et al. | |
| 10,752,522 B2 | 8/2020 | Henderson et al. | |
| 11,066,313 B1 | 7/2021 | Djukanovic et al. | |
| 2011/0174743 A1 | 7/2011 | Huang | |
| 2014/0326674 A1 | 11/2014 | Richardson | |
| 2018/0273410 A1* | 9/2018 | Grogan | C02F 1/488 |
| 2019/0092658 A1* | 3/2019 | Code | C02F 1/283 |
| 2019/0322554 A1* | 10/2019 | Knoll | C02F 11/122 |
| 2020/0054994 A1* | 2/2020 | Stuhler | B01D 53/64 |
| 2020/0156968 A1 | 5/2020 | Henderson et al. | |

FOREIGN PATENT DOCUMENTS

| | | | | |
|---|---|---|---|---|
| AU | 7841798 A | * | 2/1999 | |
| EP | 2512997 A2 | * | 10/2012 | ......... B01J 20/0229 |
| ES | 2265268 B1 | * | 2/2008 | ............... C02F 1/70 |
| WO | 2014/088826 A1 | | 6/2014 | |

OTHER PUBLICATIONS

International Food Information Service. (2009). Dictionary of Food Science and Technology (2nd Edition)—Mercury. International Food Information Service (IFIS Publishing). Retrieved from https://app.knovel.com/hotlink/pdf/id:kt006QDRG1/dictionary-food-science/mercury (Year: 2009).*

IARC Working Group on the Evaluation of Carcinogenic Risks to Humans. Beryllium, Cadmium, Mercury, and Exposures in the Glass Manufacturing Industry. Lyon (FR): International Agency for Research on Cancer; 1993. (IARC Monographs on the Evaluation of Carcinogenic Risks to Humans, No. 58.) (Year: 1993).*

ThermoFisher Scientific (2010) Safety Data Sheet Sulfamic Acid (https://www.fishersci.com/store/msds?partNumber=A295500&productDescription=SULFAMIC+ACID+CERTIFIED+500G&vendorId=VN00033897&countryCode=US&language=en) (Year: 2010).*

Yager, Tracy JB, et al. Effects of surface applications of biosolids on groundwater quality and trace-element concentrations in crops near Deer Trail, Colorado, 2004-2010. No. 2013-5065. US Geological Survey, 2013. (Year: 2013).*

Machine generated translation of ES2265268A1 (Year: 2008).*

Ferro, S. Removal of Nitrates from Highly-Contaminated Industrial Wastewater. La Chimica & L'Industria. Mar. 2012; p. 102-103.

* cited by examiner

*Primary Examiner* — Magali P Slawski
*Assistant Examiner* — Bernadette Karen McGann
(74) *Attorney, Agent, or Firm* — Oliff PLC

(57) ABSTRACT

A method of treating water to remove selenium and/or mercury that is dissolved in the water. The method includes adding an acid to the water to reduce the pH, adding a metal reagent to the water that is effective to reduce the selenium and/or mercury to a lower oxidation state, and then removing the reduced selenium and/or mercury from the water.

16 Claims, No Drawings

METHODS OF TREATING WATER TO REMOVE SELENIUM OR MERCURY

BACKGROUND

The purification and filtration of water and other aqueous solutions to remove toxic materials, such as selenium and mercury, is necessary for many applications, such as the treatment of feeds, waste streams, process streams and by-products associated with various industrial processes, the provision of safe portable drinking water, and the treatment and control of municipal waste water.

The presence of various compound forms of selenium in water is of great environmental concern as selenium-containing compounds can be extremely toxic. Additionally, regulatory agencies have placed strict guidelines on discharging selenium to the environment. In particular, facilities that generate selenium are restricted to 12 parts per billion (ppb) discharge limits and in many cases must treat to less than 5 ppb. It has proven particularly difficult to remove selenate anion ($SeO_4^{2-}$) from water. Chemical coagulants such as ferric oxide can effectively remove selenite when fed in excess, but show little efficacy for removing selenate. Activated alumina has also been shown to be an effective media for removing selenite, but gives poor results for selenate removal. While biological reactors have been shown to remove both selenite and selenate by reduction to elemental selenium, these systems cost around $30 million to treat 300-400 gpm (gallon per minute) of water. Additionally, microbiological upsets occur causing selenium levels to spike. As a result, many advanced water purification technologies have had limited application with respect to removal and collection of selenate from waters and other aqueous solutions.

The presence of mercury in water is also a significant concern. Mercury exposure has been associated with neurological and developmental damage in humans, and recent proposed Effluent Limitation Guidelines (ELG) have decreased the amount mercury that is acceptable to discharge in wastewater. Current removal methods, such as by using polysuflides, are toxic, unreliable, and are not able to consistently achieve reduction of mercury to the very low levels required by environmental guidelines.

Accordingly, there remains a need for improved methods (in terms of: cost, simplicity, reliability, efficiency and selectivity) for removal of these unwanted anions from water.

SUMMARY

Accordingly, embodiments of this invention provide improved methods for treating water to remove dissolved selenium and/or mercury. In one aspect, this disclosure provides a method of treating water that includes at least one target compound selected from selenium and mercury to remove the target compound. The method includes steps of adding an acid to the water to reduce the pH, adding a metal reagent to the water that is effective to reduce the target compound to a lower oxidation state, and removing the reduced target compound from the water.

DETAILED DESCRIPTION OF EMBODIMENTS

The methods described herein include treating water containing selenium ions and/or mercury ions (referred to herein as "target compounds") by contacting the water with (i) an acid that is effective to reduce the pH of the water, and (ii) a metal reagent that is effective to reduce the selenium and/or mercury to lower oxidation state compounds that can be removed from the water. The methods described herein can be particularly effective to remove selenium present as selenium oxyanions (e.g., selenate; selenite) from the water, and/or to remove mercury present as mercury (II) or mercury (IV) ions from the water. The acid is added to reduce the pH of the water, which facilitates the reduction reaction and enables a high proportion of the target compound to be removed.

The term "water" is used herein to refer to any aqueous composition containing primarily water. The water that has the target compounds dissolved therein can be water that originates and/or is derived from a natural and/or industrial source. Water sources may include aqueous streams, drinking waters, potable waters, recreational waters, waters derived from manufacturing processes, wastewaters, pool waters, spa waters, cooling waters, boiler waters, process waters, municipal waters, sewage waters, agricultural waters, ground waters, power plant waters, mine waters, remediation waters, co-mingled water, and combinations thereof.

In aqueous environments or water, dissolved inorganic selenium is normally present as (+6 oxidation state) selenate ($SeO_4^{-2}$) and as (+4 oxidation state) selenite ($SeO_3^{-2}$). The soluble inorganic Se forms, selenite and selenate, account for the majority of the total Se concentration found in natural, agricultural, or discharged waters and other aqueous solutions. The proportion of selenate/selenite present in waters is generally governed by the pH-redox status of the system. Selenate is stable under alkaline and oxidizing conditions and selenite is stable under mildly oxidizing conditions. The ratio of selenate to selenite present in natural waters is also affected by the different adsorption kinetics of selenate versus selenite. Selenite has a strong affinity for a variety of common minerals at pH values less than 7, whereas selenate does not; selenite also has a strong affinity for particulate organic matter. Selenate is highly soluble in water and is very difficult to remove using conventional methods. In aspects of the invention, the selenate can be reduced to either selenite or elemental selenium.

In some embodiments, the water that is treated by the methods of the present disclosure may contain from about 5 ppb to about 5,000 ppm of selenium dissolved within the water, such as from about 10 ppb to about 500 ppm, or from about 25 ppb to about 1 ppm, or from about 100 ppb to about 500 ppb. In other aspects, the untreated water can include from about 12 ppb to about 400 ppb of selenium, from about 20 ppb to about 200 ppb of selenium, or from about 20 ppb to about 100 ppb of selenium, or from about 20 ppb to about 50 ppb of selenium. Selenate may make up at least 25% of the mass of selenium in the untreated water, or at least 50%, or at least 70%, for example. The mass ratio of selenate to selenite in the untreated water may be in the range of from 5:1 to 1:5, from 4:1 to 1:1, or from 3:1 to 2:1, for example. As used herein, the weight of the selenium entities in the water refers to the weight of the component as selenium.

The mercury that is present in the water is primarily ionic mercury as $Hg^{2+}$ (e.g., as HgO) or $Hg^{4+}$. In aspects of the invention, the mercury can be reduced to $Hg^{1+}$ or elemental mercury. The water that is treated by the methods of the present disclosure may contain mercury in amounts of from 20 ppt to 1,000 ppb, from 50 ppt to 100 ppb, from 75 ppt to 10 ppb, and from 100 ppt to 1,000 ppt, for example. The weight of the mercury entities refers to the weight of the component as mercury.

The metal reagent may be any suitable metal reagent for reducing the selenium ions and/or mercury ions to a lower oxidation state. For example, the metal reagent may be zinc, iron, copper, cadmium, chromium, lead, tin, aluminum, nickel, manganese, magnesium, and alloys or mixtures thereof. The metal reagent may be in an elemental form that is provided as powder, rods, shots, fines, pebbles, liquid suspension, or impregnated in a membrane or resin media, for example. If the metal reagent includes zinc, it may be provided as zinc powder or a granular solid zinc shot. Exemplary systems and methods disclosed herein may employ a resin media, such as, but not limited to, polystyrene sulfonate and zeolites impregnated with the metal reagent.

The amount of the metal reagent that is added to the water can be based on the measured or expected concentration of the target compound. The metal reagent can be added to the water in an amount sufficient to reduce the amount of the target compound (i.e., selenium and/or mercury) by at least 50%, and preferably at least 75%, or at 85%. It has been discovered that the methods described herein can advantageously remove both mercury and selenium at the same time, e.g., where each of those components can be significantly reduced by at least 50% or at least 75%. This is a very useful discovery, for example, in treating wastewater that has levels of both selenium and mercury that exceed acceptable limits. This level of removal efficacy is surprising since the reduction of selenium and mercury has not been shown to occur under these conditions. And, when both target compounds are present in the water, they would compete with each other for the reduction reaction. It is also believed, that in addition to significantly reducing quantities of selenium and/or mercury, the methods described herein could be effective to reduce the amount of nitrate, arsenic, copper, thallium, and/or cadmium that is dissolved in the water.

Where the target compound includes selenium, the metal reagent may be added to the water in a ratio of 1:1 to 10,000:1 of the mass of metal regent to the mass of selenium in the water, or a ratio of 100:1 to 5,000:1, or 1,000:1 to 4,000:1. And where the target compound is mercury, the metal reagent may be introduced to the water in a ratio of $1\times10^2:1$ to $1\times10^8:1$ of the mass of the metal reagent to the mass of mercury in the water, or from $1\times10^4:1$ to $1\times10^7:1$, or from $1\times10^5:1$ to $1\times10^6:1$, for example.

The acid may be any suitable acid that is capable of reducing the pH of the water to the desired level. Acids containing amine groups such as sulfamic acid can be used as the acid. In another aspect, sulfuric acid can be used. In one exemplary embodiment, zinc may be used as the metal reagent and sulfamic acid may be used as the acid. The acid can be added to the water in powder or liquid form, for example.

It has been discovered that a decrease in the pH of the water stream facilitates reduction of the selenium and mercury upon contact with the metal reagent in the mix tank or water stream. For example, the water may have an initial pH of higher than 6 such as about 6.5 to about 8.5, or 6.5 to 7.5. At that pH, the reduction reaction may be inhibited. To promote the reduction reaction, an amount of acid can be added to decrease the pH of the water stream to a pH of about 2 to about 6, about 3 to about 5, or about 3 to about 4. In some embodiments, the amount of acid that is added to the water may be in the range of 50 ppm to 10,000 ppm, from 100 ppm to 5,000 ppm, or from 1,000 to 2,500 ppm, for example.

In the methods and systems disclosed herein, the water can be contacted with the metal reagent and the acid sequentially or simultaneously. For example, the acid can be introduced into the water to decrease the pH before adding the metal reagent. Alternatively, the acid and metal reagent may be introduced into the water simultaneously to reduce the pH of the water stream and begin the reduction reaction of the target compound. The reduction reaction can occur in a mix tank or other container that holds the water while it is being treated. The reduction reaction can be allowed to proceed for time periods in the range of 5 min to 4 hours, 10 min to 2 hours, or 20 min to 60 min, for example, before removing the target compound.

The treatment techniques described herein can be effective to reduce the selenium and/or mercury to entities with lower oxidation states that are easier to remove. For example, selenate can be reduced to selenite, which may then be removed by other known chemical methods such as, for example, precipitation with iron salts. Alternatively, the reduction reaction can be effective to reduce the target compound to an entity (e.g., elemental selenium or mercury) that precipitates in the water and/or adsorbs onto a surface to allow for its removal. The precipitated/adsorbed compound can then be separated from the water by chemical and/or physical separation techniques.

In one aspect, a base can be added once the reduction reaction proceeds to the desired extent to raise the pH to greater than 6.5, greater than 7.5, or greater than 8 to precipitate the metal reagent. Surfaces of the precipitated metal reagent and/or other precipitates may act as a substrate on which the target compounds can precipitate/adsorb. This facilitates removal of the metal reagent and the target compound because the solid precipitates can be removed by chemical and/or physical separation techniques, e.g., filtration, settling, centrifugation, etc.

The foregoing is further illustrated by reference to the following examples, which are presented for purposes of illustration and are not intended to limit the scope of the present disclosure.

Example—Selenium Removal

Examples 1-4 are samples of untreated water collected from industrial wastewater and shipped to a lab for screening. The samples were tested at room temperature. 250 ml samples were mixed at 150 RPM; zinc and sulfamic acid were added to the treated samples and mixed for 30 minutes. The pH was maintained below pH 4 during the mixing. After 30 minutes of mixing the pH was adjusted to 8.5 pH with use of NaOH. The solids that were formed at pH 8.5 were removed with the use of flocculant and settling time. The final treated effluent was the supernatant that was submitted for testing.

Example 5 is a field trial in which the untreated water is flue gas desulfurization (FGD) waste water from the equalization tank. 200 gallons of FGD wastewater were treated by addition of zinc powder and sulfamic acid while the batch was mixed. Once the chemicals were added, the mixing continued for 30 minutes while the pH was monitored to ensure it stays below pH 4. After 30 minutes of mixing the pH was adjusted to 8.5 pH by adding NaOH. The solids that were formed at pH 8.5 were removed with the use of flocculant and settling time. The final treated effluent was the supernatant that was submitted for testing.

| Example | Untreated water Se (ppb) | Treated water Se (ppb) | % removal |
|---|---|---|---|
| 1 | 77 | 12 | 84.42 |
| 2 | 190 | 33 | 82.63 |
| 3 | 15 | 1.5 | 90.00 |
| 4 | 460 | 2.5 | 99.46 |
| 5 | 9.9 | 1.7 | 82.83 |

Example—Mercury Removal

Mercury removal data was collected over a period of 12 days during a trial. Untreated water was coming from power plant FGD EQ tank. 200 gallons of FGD wastewater were treated by addition of zinc powder and sulfamic acid while the batch was mixed. Once the chemicals were added the mixing continued for 30 minutes while the pH was monitored to ensure it stays below pH 4. After 30 minutes of mixing the pH was adjusted to 8.5 pH by adding NaOH. The solids that were formed at pH 8.5 were removed with the use of flocculant and settling time. The final treated effluent was the supernatant that was submitted for testing.

| Untreated water Hg (ppt) | Treated water Hg (ppt) | % removal |
|---|---|---|
| 180 | 1.4 | 99.22 |
| 40 | 0.93 | 97.68 |
| 35 | 0.62 | 98.23 |
| 180 | 0.43 | 99.76 |
| 70 | 0.2 | 99.71 |
| 450 | 0.96 | 99.79 |
| 36 | 0.2 | 99.44 |
| 64 | 0.27 | 99.58 |
| 62 | 0.5 | 99.19 |
| 110 | 0.52 | 99.53 |
| 35 | 0.38 | 98.91 |
| 59 | 0.36 | 99.39 |

These examples demonstrate that using a metal reducing reagent and an acid to treat water that contains selenium and mercury can significantly reduce the amount of selenium and mercury in the treated water, including to levels that are well below ELG limits.

This disclosure has been presented for purposes of illustration and description and is not intended to be exhaustive or limiting. Modifications and variations will be apparent to those of ordinary skill in the art, while still practicing the inventions defined in the claims. The embodiments were chosen and described in order to explain principles and practical applications, and to enable others of ordinary skill in the art to understand the disclosure for various embodiments with various modifications as are suited to the particular use contemplated.

What is claimed is:

1. A method of treating water that includes (i) selenium in an amount of about 5 ppb to about 500 ppm, (ii) mercury in an amount of about 20 ppt to 100 ppb, and (iii) nitrate, the method comprising:
    adding a sufficient amount of sulfamic acid to the water to reduce the pH of the water to a range of from 2 to 6;
    adding elemental zinc to the water, and reducing each of the selenium, mercury, and nitrate to a lower oxidation state with the elemental zinc while the pH of the water is maintained in the range of from 2 to 6; and
    removing the selenium, mercury, and nitrate from the water, wherein the method of treating the water is effective to decrease the amount of selenium and mercury in the water by at least 50% based on mass.

2. The method of treating water according to claim 1, wherein at least some of the selenium in the water is in the form of selenate.

3. The method of treating water according to claim 2, wherein at least 25% of the mass of selenium in the untreated water is in the form of selenate.

4. The method of treating water according to claim 2, wherein the method is effective to reduce the selenate to selenite.

5. The method of treating water according to claim 2, wherein the method is effective to reduce the selenate to elemental selenium.

6. The method of treating water according to claim 1, wherein the reduction of the selenium to the lower oxidation state is effective to cause (i) the selenium to precipitate; and/or (ii) the selenium to adsorb on a substrate.

7. The method of treating water according to claim 1, wherein, after the step of adding the elemental zinc to the water, further comprising adding a sufficient amount of base to the water to raise the pH and precipitate the elemental zinc.

8. The method of treating water according to claim 1, wherein the water has a pH of greater than 6.5 prior to being treated.

9. The method of treating water according to claim 1, wherein the method further comprises reducing an amount of an additional target compound that is dissolved in the water, the additional target compound being selected from at least one of arsenic, copper, thallium, and cadmium.

10. The method of treating water according to claim 1, wherein the step of removing the selenium and mercury comprises physically separating the selenium and mercury from the water.

11. The method of treating water according to claim 1, wherein the reduction of the mercury to the lower oxidation state is effective to cause (i) the mercury to precipitate; and/or (ii) the mercury to adsorb on a substrate.

12. The method of treating water according to claim 1, wherein the method of treating the water is effective to decrease the amount of selenium and mercury in the water by at least 75% based on mass.

13. The method of treating water according to claim 1, wherein the method of treating the water is effective to decrease the amount of selenium and mercury in the water by at least 85% based on mass.

14. The method of treating water according to claim 1, wherein the mercury in the water is primarily in the form of ionic mercury.

15. The method of treating water according to claim 1, wherein a sufficient amount of the sulfamic acid is added to the water to reduce the pH of the water to a range of from 3 to 6, and wherein each of the selenium, mercury, and nitrate is reduced to a lower oxidation state with the elemental zinc while the pH of the water is maintained in a range of from 3 to 6.

16. The method of treating water according to claim 1, wherein a sufficient amount of the sulfamic acid is added to the water to reduce the pH of the water to a range of from 3 to 5, and wherein each of the selenium, mercury, and nitrate is reduced to a lower oxidation state with the elemental zinc while the pH of the water is maintained in a range of from 3 to 5.

* * * * *